Patented Mar. 3, 1931

1,794,875

UNITED STATES PATENT OFFICE

EDUARD TSCHUNKUR, OF COLOGNE-MULHEIM, AND HELMUTH MEIS, OF LEVERKUSEN-ON-THE-RHINE, GERMANY, ASSIGNORS TO I. G. FARBENINDUSTRIE AKTIENGESELL-SCHAFT, OF FRANKFORT-ON-THE-MAIN, GERMANY, A CORPORATION OF GERMANY

PROCESS FOR PRODUCING SUBSTITUTED GUANIDINES

No Drawing. Application filed September 15, 1927, Serial No. 219,810, and in Germany October 6, 1926.

The present invention relates to a process for producing substituted guanidines.

In accordance with the invention a cyanogen halide, such as cyanogen chloride, is caused to react upon an organic amine containing at least one hydrogen atom attached directly to the amine nitrogen in the presence of a salt of said amine in an amount exceeding that which can possibly be formed during the reaction, whereby substituted guanidines are obtained in a nearly quantitative yield and in a good state of purity. It is advantageous to use not less than 2 mols of the free base and 1 mol of the cyanogen halide.

*Example.*—In a closed vessel a mixture of 100 parts by weight of aniline, 20 parts by weight of aniline hydrochloride and 500 parts by weight of $CCl_4$ or water is cooled down to zero to which mixture 20 parts by weight of cyanogen chloride are added. Subsequently the mixture is stirred for a short while and is then heated during one hour to about from 80 to 100° C. The mixture is rendered alkaline the free aniline is driven over with steam and the diphenylguanidine remains. It has the formula

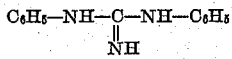

Instead of aniline other bases can be used, e. g. ethyl aniline, toluidine, diethylamine, methylamine, piperidine etc. Other salts of bases can be used e. g. sulfates, acetates, benzoates, etc. and cyanogen bromide can be used in the same way.

We claim:—

1. In the process of producing substituted guanidines the step which comprises treating a cyanogen halide with an organic amine having at least 1 hydrogen atom attached directly to the amine nitrogen, in the presence of a salt of said amine in an amount exceeding that which can possibly be formed during the reaction.

2. In the process of producing disubstituted guanidines the step which comprises treating a cyanogen halide with a primary amine in the presence of a salt of said amine in an amount exceeding that which can possibly be formed during the reaction.

3. In the process of producing diphenylguanidine of the probable formula

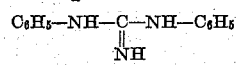

the step which comprises treating a cyanogen halide with aniline and a salt of aniline in an amount exceeding that which can possibly be formed during the reaction.

4. In the process of producing diphenylguanidine of the probable formula

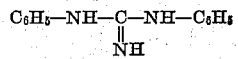

the step which comprises treating cyanogen chloride with aniline and a salt of aniline in an amount exceeding that which can possibly be formed during the reaction.

5. In the process of producing diphenylguanidine of the probable formula

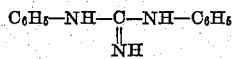

the step which comprises treating cyanogen chloride with aniline and aniline hydrochloride in an amount exceeding that which can possibly be formed during the reaction.

In testimony whereof we have hereunto set our hands.

EDUARD TSCHUNKUR.
HELMUTH MEIS.